(12) United States Patent
Burgler et al.

(10) Patent No.: US 10,052,709 B2
(45) Date of Patent: Aug. 21, 2018

(54) WELDING MACHINE FOR CONNECTION OF OVERLAPPING MATERIAL WEBS

(71) Applicants: Roger Burgler, Ennetburgen (CH); Felix Schilter, Altdorf (CH)

(72) Inventors: Roger Burgler, Ennetburgen (CH); Felix Schilter, Altdorf (CH)

(73) Assignee: Leister Technologies AG, Kaegiswil (CH)

( * ) Notice: Subject to any disclaimer, the term of this patent is extended or adjusted under 35 U.S.C. 154(b) by 310 days.

(21) Appl. No.: 14/958,172

(22) Filed: Dec. 3, 2015

(65) Prior Publication Data

US 2016/0158871 A1   Jun. 9, 2016

(30) Foreign Application Priority Data

Dec. 4, 2014 (EP) ..................... 14196358

(51) Int. Cl.
| | |
|---|---|
| *B23K 11/02* | (2006.01) |
| *B23K 11/00* | (2006.01) |
| *B29C 65/10* | (2006.01) |
| *B29C 65/00* | (2006.01) |
| *F24H 3/04* | (2006.01) |
| *B29L 31/10* | (2006.01) |

(52) U.S. Cl.
CPC ............ *B23K 11/02* (2013.01); *B23K 11/002* (2013.01); *B29C 65/10* (2013.01); *B29C 66/1122* (2013.01); *B29C 66/43* (2013.01); *B29C 66/80* (2013.01); *B29C 66/8362* (2013.01); *B29C 66/86521* (2013.01); *F24H 3/0423* (2013.01); *B29C 65/103* (2013.01); *B29C 66/8167* (2013.01); *B29L 2031/108* (2013.01)

(58) Field of Classification Search
CPC ....... B23K 11/002; B23K 11/02; B29C 65/10; B29C 66/43; B29C 66/8362; B29C 66/86521; B29C 66/80; B29C 66/1122; B29C 65/103; B29C 66/8167; F24H 3/0423; B29L 2031/108
USPC ...................................... 219/78.01
See application file for complete search history.

(56) References Cited

U.S. PATENT DOCUMENTS 2,967,387 A * 1/1961 Barnes .................... B29C 65/18
  53/373.7
3,120,089 A * 2/1964 Egleston ............. B29C 65/7882
  192/150

(Continued)

*Primary Examiner* — Eric Stapleton
(74) *Attorney, Agent, or Firm* — Dennemeyer & Associates, LLC.

(57) ABSTRACT

Welding machine for edge-side connection at the edge of overlapping material webs, wherein the materials are connectable to one another under the effect of heat and subsequent pressure, with a chassis on which at least guide rollers, a heating device and at least one pressure roller are arranged. The heating device has a cantilevered contact heating element that can be inserted laterally between the edges of the material webs, wherein the chassis is driven by an electric motor which is arranged on a longitudinal leg of the chassis. The electric motor according to the invention is formed as a brushless DC motor and the reduction gear as a planetary gear, which are united by a drum drive motor. In this case, the direct current motor is preferably a disk rotor motor. The chassis has a lateral leg which is adjustable perpendicularly to the working direction relative to the longitudinal leg.

9 Claims, 4 Drawing Sheets

(56) References Cited

U.S. PATENT DOCUMENTS

| | | | | |
|---|---|---|---|---|
| 3,149,560 | A * | 9/1964 | Finke | A41H 43/04 100/219 |
| 3,338,770 | A * | 8/1967 | Billingsley | B29C 65/18 156/359 |
| 3,368,323 | A * | 2/1968 | Wood | B29C 66/1122 100/2 |
| 3,522,689 | A * | 8/1970 | Wylie | B29C 65/18 493/203 |
| 3,549,462 | A * | 12/1970 | Hollis | B29C 65/18 156/290 |
| 3,587,258 | A * | 6/1971 | Bohuslav | C14B 1/44 38/61 |
| 3,832,262 | A * | 8/1974 | Rubaud | A63C 11/04 156/468 |
| 3,944,460 | A * | 3/1976 | Karr | B29C 65/20 100/33 PB |
| 4,019,946 | A * | 4/1977 | Greisman | B29C 65/02 156/497 |
| 4,030,956 | A * | 6/1977 | Jan Leloux | B29C 65/18 156/290 |
| 4,065,943 | A * | 1/1978 | Dokoupil | C14B 1/54 69/41 |
| 4,142,386 | A * | 3/1979 | Dokoupil | C14B 1/56 100/160 |
| 4,146,419 | A * | 3/1979 | Neidhart | B29C 66/1122 156/391 |
| 4,172,750 | A * | 10/1979 | Giulie | B29C 65/18 100/137 |
| 4,230,029 | A * | 10/1980 | Schott, Jr. | B26D 1/045 493/195 |
| 4,238,939 | A * | 12/1980 | Miculka | C14B 1/54 69/43 |
| 4,272,314 | A * | 6/1981 | Banai | B29C 65/20 100/33 PB |
| 4,305,240 | A * | 12/1981 | Grevich | B29C 65/18 493/194 |
| 4,391,666 | A * | 7/1983 | Mueller | B26D 1/085 156/184 |
| 4,504,352 | A * | 3/1985 | Meyer | B29C 66/1122 156/499 |
| 4,545,844 | A * | 10/1985 | Buchanan | B29C 65/74 156/251 |
| 4,554,752 | A * | 11/1985 | Bosshart | D06F 65/06 38/47 |
| 4,744,855 | A * | 5/1988 | Ellenberger | B29C 65/20 156/499 |
| 4,753,629 | A * | 6/1988 | Powell | B29C 65/18 493/193 |
| 4,834,828 | A * | 5/1989 | Murphy | B29C 65/103 156/359 |
| 4,872,941 | A * | 10/1989 | Lippman | B29C 65/10 156/497 |
| 4,923,558 | A * | 5/1990 | Ellenberger | B29C 66/1122 100/171 |
| 4,946,528 | A * | 8/1990 | Takahashi | B29C 63/0004 156/187 |
| 5,051,148 | A * | 9/1991 | Resch | B29C 66/1122 156/358 |
| 5,169,052 | A * | 12/1992 | Kaminski | B29C 66/8362 156/391 |
| 5,328,545 | A * | 7/1994 | Kaminski | B29C 65/78 100/171 |
| 5,435,883 | A * | 7/1995 | Myers | B30B 1/12 100/50 |
| 5,490,626 | A * | 2/1996 | Kaminski | B29C 66/1122 100/304 |
| 5,503,705 | A * | 4/1996 | Rohleder | B29C 59/046 156/209 |
| 5,506,019 | A * | 4/1996 | Abeyta | A47G 11/007 108/165 |
| 5,527,406 | A * | 6/1996 | Brath | B29C 65/7802 156/304.2 |
| 5,570,568 | A * | 11/1996 | Kramer | B65B 43/123 156/358 |
| 5,624,511 | A * | 4/1997 | Lippman | B29C 65/7835 156/157 |
| 5,653,095 | A * | 8/1997 | Stamm | B65B 13/22 100/32 |
| 5,662,575 | A * | 9/1997 | Saito | B29C 65/02 493/190 |
| 5,787,681 | A * | 8/1998 | Papina | B29C 65/3656 156/358 |
| 5,865,942 | A * | 2/1999 | Sinclair | B29C 66/1122 156/499 |
| 5,873,965 | A * | 2/1999 | Greller | B29C 66/1122 156/358 |
| 6,050,317 | A * | 4/2000 | Weissfloch | B29C 66/1122 156/499 |
| 6,155,321 | A * | 12/2000 | Bindschedler | E01C 23/03 156/497 |
| 6,170,550 | B1 * | 1/2001 | Niederberger | B29C 65/02 156/544 |
| 6,186,210 | B1 * | 2/2001 | Gehde | B29C 65/10 156/499 |
| 6,213,184 | B1 * | 4/2001 | Sinclair | B29C 66/1122 156/499 |
| 6,378,589 | B1 * | 4/2002 | Struve | B29C 65/20 156/499 |
| 6,390,168 | B1 * | 5/2002 | Struve | B29C 65/20 156/499 |
| 6,688,361 | B2 * | 2/2004 | Schnabel | B29C 65/20 156/359 |
| 6,805,179 | B2 * | 10/2004 | Velasquez | B32B 37/226 156/353 |
| 6,913,665 | B2 * | 7/2005 | Zurmuehle | B29C 66/8362 156/391 |
| 8,043,451 | B2 * | 10/2011 | Herz | B29C 65/20 156/499 |
| 8,230,892 | B1 * | 7/2012 | George | B29C 65/2061 156/308.4 |
| 9,415,541 | B2 * | 8/2016 | Gisler | B32B 37/0046 |
| 2003/0000650 | A1 * | 1/2003 | Schnabel | B29C 65/20 156/583.1 |
| 2004/0011472 | A1 * | 1/2004 | Zurmuhle | B29C 65/10 156/502 |
| 2015/0239173 | A1 * | 8/2015 | Gisler | B32B 37/0046 156/583.1 |

* cited by examiner

WELDING MACHINE FOR CONNECTION OF OVERLAPPING MATERIAL WEBS

The invention relates to a welding machine for edge-side connection of overlapping upper material webs with overlapping lower material webs, wherein the material webs are connected to one another under the effect of heat and subsequent pressure, with a chassis on which at least guide rollers, a heating device and at least one pressure roller are arranged, wherein the heating device has a laterally-cantilevered contact heating element that can be inserted between the edges of the material webs and wherein the pressure roller can be placed on the edges of the material webs in the working direction and arranged behind the contact heating element and driven by an electric motor with a downstream reduction gear, wherein the chassis is L-shaped or T-shaped with a longitudinal leg extending in the working direction and a lateral leg extending at right angles to the longitudinal leg.

Such devices for welding flat material webs, such as bitumen or plastic material, are already known in various embodiments. Thus, EP 1 371 474 A1 discloses a welding machine for connecting material webs with overlapping edges, wherein a chassis is driven along the overlapping area of the material webs to be connected and the material webs are connected with one another by a welding machine arranged and entrained on the chassis. The material webs are connected together by being locally heated with a heating device of the welding device at the mutually overlapping edge regions by means of a laterally protruding contact heating element that is inserted between the edge regions and subsequently subjected to a pressing device with a pressure roller that is applied to the plasticised edge regions in order to produce a firm, i.e. positive, material connection between the edge regions of the material webs. The heat is conducted for example by hot air, which is generated by an electric or gas heating element of the heating device and guided to the corresponding edge regions of the material webs, and which exits via the contact heating element. In the known welding machine, the pressure roller is also the driving roller for the chassis.

The disadvantage of this welding machine is that the electric motor and the downstream reduction gear require a lot of space and that a complex power transmission device connects the drive roller (pressure roller) with the reduction gear. This, in turn, results in a bulky design, which is not a problem when the automatic welding machine is used on a freestanding ground surface, but often causes a problem when working close to edges or borders of the surface. In addition, the welding area is limited in the known welding unit since the contact heating element and the pressure roller are partially covered by the electric motor, the reduction gear, the power transmission device and/or the chassis.

Starting from this prior art, the invention addresses the problem of proposing a generic welding machine with a more compact design, which is also able to work close to the edges of parapets, skylights, chimneys, etc. and where the respective current welding region is clearly visible.

This object is achieved by a welding machine with the features of independent claim 1. Further advantageous embodiments of the invention are described in the dependant claims.

The central idea of the present invention is to develop an innovative drive concept for a generic welding machine with the features of the preamble of independent claim 1 in order to achieve a compact construction. The new drive concept provides for the integration of the electric motor and the reduction gear in the pressure roller, to make the lateral leg of the chassis, on which the guide rollers are arranged, slidably displaceable with respect to the longitudinal leg of the chassis carrying the heating device and to make the pressure rollers modular in order to define the width variably.

To this end, the automatic welding machine according to the invention has a drum driving motor for driving, wherein the electric motor is a brushless DC motor and the reduction gear is a planetary gear system.

Brushless DC motors are known. They are based on a synchronous machine with excitation by permanent magnets. The often tri-phase winding generates a rotating magnetic field which entrains the permanent-magnet rotor. A control response is achieved by means of a suitable control circuit, wherein the response largely corresponds to the behaviour of a DC machine. To this end, a simplified frequency converter with block commutation is used, wherein the intermediate circuit is supplied directly with a variable DC voltage in order to control the speed of the motor in this way.

Planetary gear systems are also known. They are often referred to as planetary gears. Such transmissions include gear wheels or friction gear wheels, which comprise shafts and axles that are not only fixed to the chassis but which run on circular paths in the chassis. In many embodiments, the rotating axes are parallel to the shafts that are fixed to the chassis. Therefore epicyclic gearing is often referred to as a planetary gear train. The gear wheels rotating on the rotating axes thereby encircle a central gear. Epicyclic gearing is compactly built with the special feature that the input and output shafts are aligned with one another.

By a "drum motor" is normally understood a very compact unit in which the electric motor and the gearbox are already housed in a common housing. Mechanical fastening means and electrical connection elements for mechanical connection and electrical connection of the motor are generally already provided on the housing. Thus, depending on the embodiment, shafts or trunnions of the drum motor are provided on the front of the housing, wherein the torque of the electric motor via the gear is preferably transmitted directly to the output shaft or the drum shell (housing) of the drum motor. In the first case, the housing is fixed and the output shaft rotates, while in the second case, the shafts are stationary and the drum shell rotates. This special design of the drum motor offers a far better efficiency than a conventional electric drive.

Preferably, the DC motor is a disk rotor motor. A disk rotor motor is an electric motor whose rotor has the shape of a disk. In the known designs, the current-carrying windings are arranged in the housing enclosing the rotor. In this case, the disk is a permanent magnet, wherein the windings (coils) are fixedly arranged on one side or both sides of the disk on the housing to create a magnetic field. The advantage of this arrangement is that no brushes are required for supplying current to the rotor and the motor is thus more reliable. Brushless disk rotors are synchronous motors or stepper motors and represent a form of brushless DC motor with electric commutation. Also known are motors with multiple disks from which the coils protrude.

Disk rotor motors are easily recognisable by the unusual construction compared to other types of motor. Its diameter is greater than the length. Such disk motors are also called pancake motors.

In a preferred embodiment of the automatic welding machine according to the invention, the drum drive motor is at least partially integrated into the pressure roller. In one embodiment, the pressure roller completely overlaps the drum drive motor, while in other embodiments the motor is only partially overlapped. In this case, the drum drive motor is secured to the longitudinal leg extending in the drive direction. It is located on one side above the longitudinal leg and carries the pressure roller. It drives the pressure roller via a motor. In this case, the pressure roller extends near the longitudinal legs of the chassis and is rotated in the longitudinal direction of the longitudinal leg. The electric motor of the drum drive motor preferably has a power consumption of at least 30 watts, preferably of at least 50 watts. The planetary gearing preferably delivers a minimum torque of 6 Nm. Thus, the welding machine according to the invention can run autonomously without problem on flat surfaces as well as on slightly sloping surfaces.

In an advantageous embodiment of the invention, the guide rollers of the chassis on the lateral leg protrude downwards, while the pressure roller with the integrated drum drive motor is arranged laterally above the longitudinal leg, wherein the width dimension of the pressure roller and of the longitudinal leg, taken together, is less than 100 mm.

In one embodiment of the automatic welding machine according to the invention, the lateral leg is also vertically adjustable in the working direction with respect to the longitudinal leg. This allows the lateral leg with the non-driven guide rollers to be laterally displaced with respect to the longitudinal leg, arranged on the heating device and the control of the welding machine, and fixed to the drum driving motor carrying the pressure roller. The chassis can thus be changed in shape from a first L-shaped structural variant, wherein the lateral leg protrudes in the working direction only on the left side of the longitudinal leg, via T-shaped variants, wherein the lateral leg extends to the left and the right of the longitudinal leg, to a second L-shaped variant wherein the lateral leg only protrudes in the working direction to the right of the longitudinal leg. This advantageously facilitates near-edge welding along upwards or downwards sloping surfaces supporting the material webs, i.e. for example, upwardly extending walls, doors, manholes or parapet edges and front edges of flat roofs. The chassis can, of course, be used as usual for flat freestanding supporting surfaces in the L-shaped structural variants and in any T-shaped version. The pressure roller protrudes laterally on the longitudinal leg, while the contact heating element is arranged in the working direction in front of, and aligned with, the pressure roller, wherein the contact heating element can be configured as a heating wedge or heating nozzle and can thus be positioned immediately next to the parapet and moved along this. This is made possible because the lateral leg can be moved sufficiently far with respect to the contact heating element and the pressure roller that each end-side roller of the lateral leg is in front of the contact heating element in the working direction and the contact heating element and the pressure roller are at least approximately aligned.

In another favourable embodiment of the invention, the width, diameter and/or shape of the pressure roller can be varied by means of tubular or cup-shaped shaping elements. The pressure roller is thus modular. It can be varied in width, diameter and shape by means of addable or removable, applicable or attachable shaping elements as a function of the welding application for welding of piping, seams, and roof profiles. The shaping elements can be arranged laterally to the pressure roller and/or overlap these on the pressure roller. Thus, in particular, various weld widths such as, for example, 40 mm, 30 mm, and 20 mm can be covered.

Specially shaped shaping elements are used for roof profiles, bead, seam and mirror welds, wherein the elements are placed over the pressure roller or laterally mounted adjacent thereto. The additional shaping elements may be attached to, or removed from, the pressure roller, without the whole pressure roller having to be disassembled and removed from the drum drive motor.

The invention will be explained in more detail by means of an exemplary embodiment shown in the drawing. Further features of the invention will become apparent from the following description of the embodiment of the invention in conjunction with the claims and the figures. The individual features of the invention may be implemented alone or in combination in various embodiments of the invention as follows:

Figure 1:
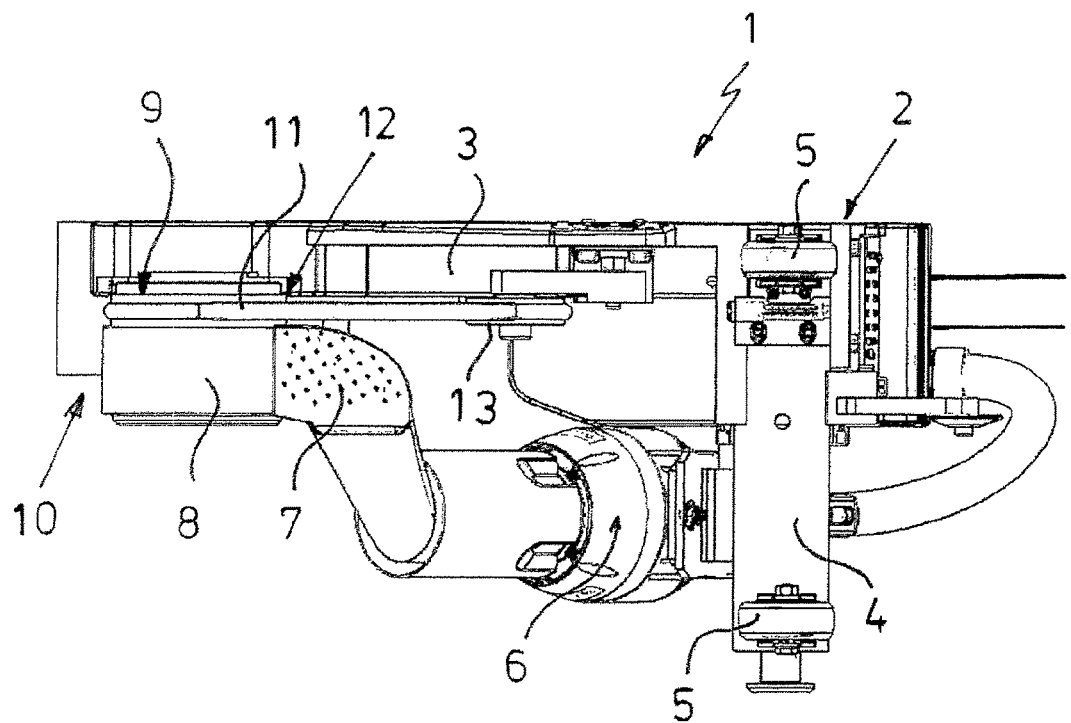
FIG. 1 shows a welding machine according to the invention with a chassis having a longitudinal and a lateral leg, a heating device, two guide rollers and a pressure roller viewed from below.

FIG. 1 shows a welding machine 1 according to the invention for edge-side connection of overlapping upper material webs with overlapped lower material webs that are positively connected to one another under the effect of heat and subsequent pressure. The automatic welding machine 1 has a chassis 2 with a longitudinal leg 3 extending in the working direction and a lateral leg 4 at right angles to this. Two rollers 5 are arranged at the end at the lateral leg 4. On the side of the chassis 2 facing away from the guide rollers 5, the longitudinal leg 3 carries a heating device 6 with a laterally protruding contact heating element 7 that can be inserted under the edge of the overlapping upper material web, wherein the contact heating element 7 is formed as a heating nozzle for a hot air flow in the embodiment. In addition, a pressure roller 8 can also be attached to the longitudinal leg 3 and placed on the edge of the upper overlapping material web, which is arranged in the working direction behind the contact heating element 7. The chassis 2 is electrically driven by a drum drive motor 9, which is at least partially integrated in the pressure roller 8.

The drum drive motor 9, which is designed as a brushless direct current motor and has a planetary gear train as a reduction gear, is fixed to the longitudinal leg 3 of the chassis 2, and rotatably supports the pressure roller 8. The drum drive motor 9 with the drive roller 8 is mounted on the longitudinal leg 3 of the chassis 2 at an end remote from the lateral leg 4, and is preferably movable in the longitudinal direction of the longitudinal leg 3. FIG. 1 shows a pressure roller 8, which is configured to weld close to the edge of bevels of the surface supporting the material webs. A pressure belt 11 extends from the pressure roller 8 in order to press the edge of an overlapping upper material web (not shown in the figure) onto an overlapped lower material web (likewise not shown), from an engagement groove 12 of the pressure roller 8 to a tensionable belt guide plate 13, which is arranged on the longitudinal leg 3 in the same direction as the guide roller 5 is arranged on the lateral leg 4. The pressure belt 11 presses the overlapping edge of the upper material web against the lower material web and thus prevents the hot air flow from the heating nozzle 7 from penetrating under the overlapping upper material web. Due to the lateral sealing of the overlapping edge, the hot air flow is guided parallel to the longitudinal leg 3 of the chassis 2, i.e. counter to the working direction of the welding machine 1. The pressure roller 8 carries an exchangeable shaped element 14, which can be adjusted especially for the effective width of the pressure roller 8.

Figure 2A:
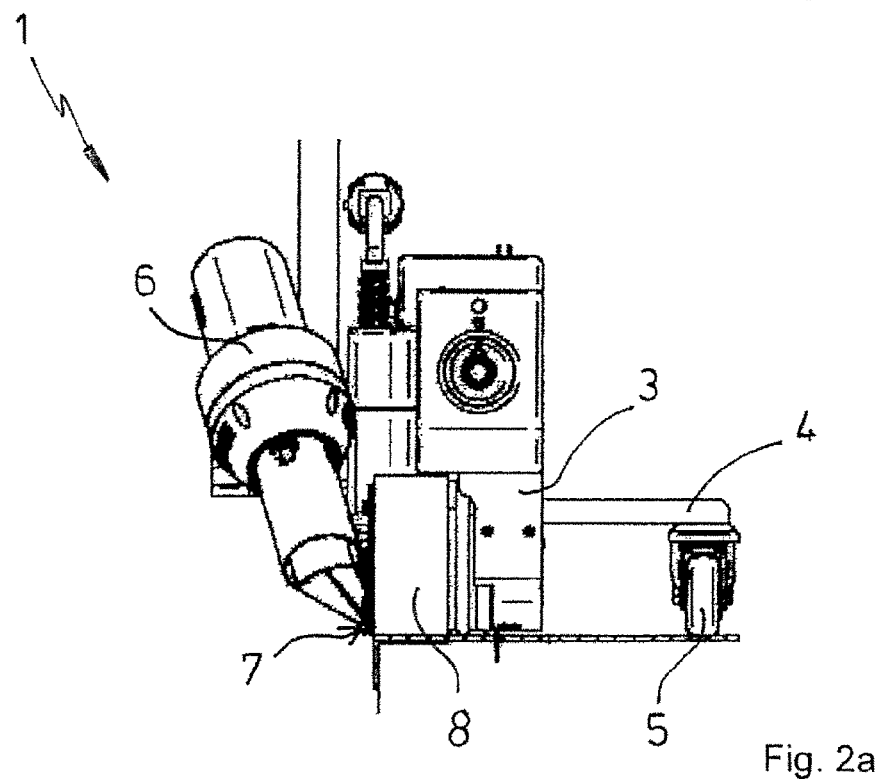
FIG. 2 shows the welding machine of FIG. 1, with a lateral leg protruding to the left of the longitudinal leg in the working direction (FIG. 2a) and a lateral leg protruding to the right (FIG. 2b), with a view on the rear side of the welding machine.
Figure 2B:
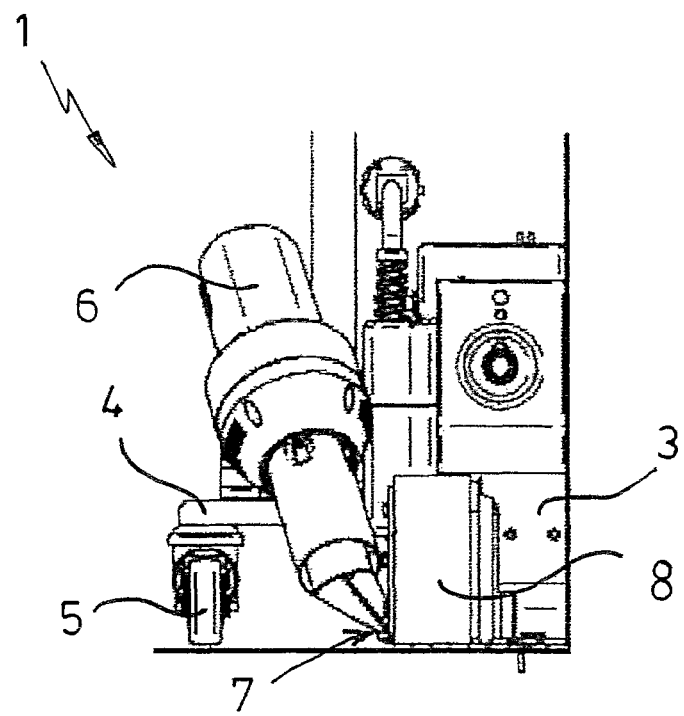

FIG. 2a shows the automatic welding machine 1 from FIG. 1 in the working direction of the lateral leg 4 protruding to the right of the longitudinal leg 3. The lateral leg 4 is vertically adjustable ion the working direction with respect to the longitudinal arm 3. FIG. 2b shows the automatic welding machine 1 with the lateral leg 4 protruding to the left of the longitudinal leg 3 in the working direction. The figures show the welding machine 1 in the working direction from the rear. In FIG. 2a, the lateral leg 4 is displaced with respect to the longitudinal leg 3 until the lateral leg 4 no longer protrudes laterally over the heating device 6 with the contact heating element 7 and the pressure roller 8. In this position, the left side guide roller 5 lies on an imaginary line with the contact heating element 7 and the pressure roller 8. The position shown is especially suited for near-edge welding on parapet edges in the case of contact surface or bead welding. In the position shown in FIG. 2b, the lateral leg 4 extends over the heating device 6 with the contact heating element 7. In this position, the right-side guide roller 5 lies in a row with the contact heating element 7 and the pressure roller 8. This position is designed specifically for the near-edge welding of end edges of the support surface.

Figure 3A:
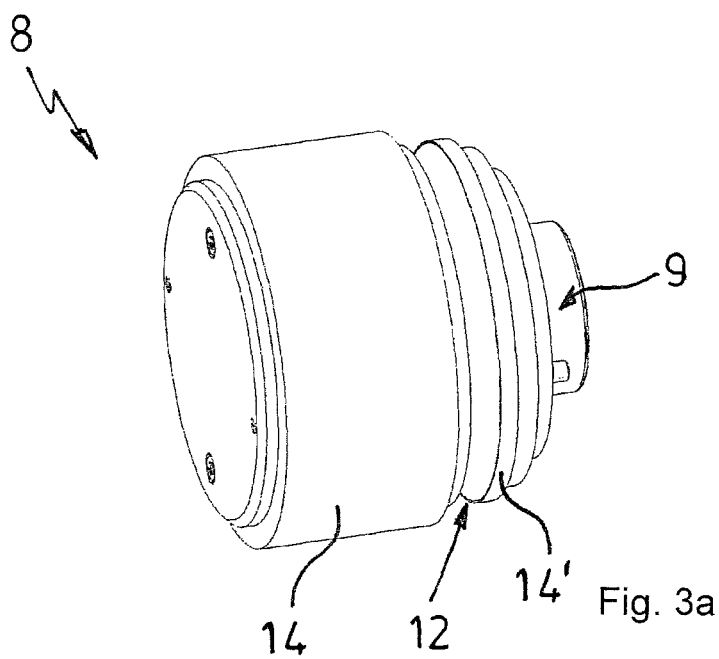
FIG. 3 shows the pressure roller of FIG. 1 in various embodiments (3a to 3d)
Figure 3B:
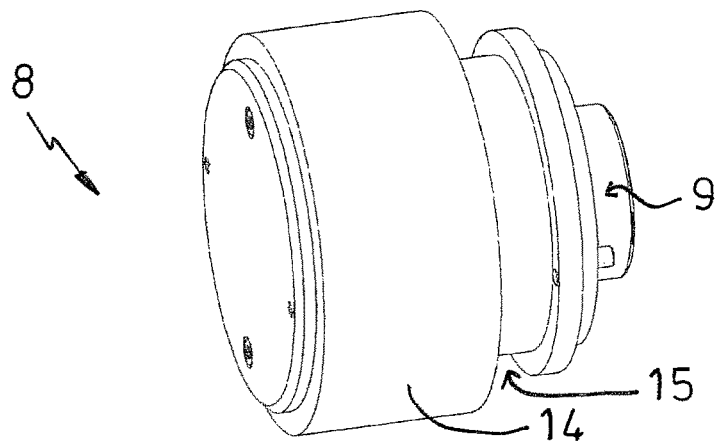
Figure 3C:
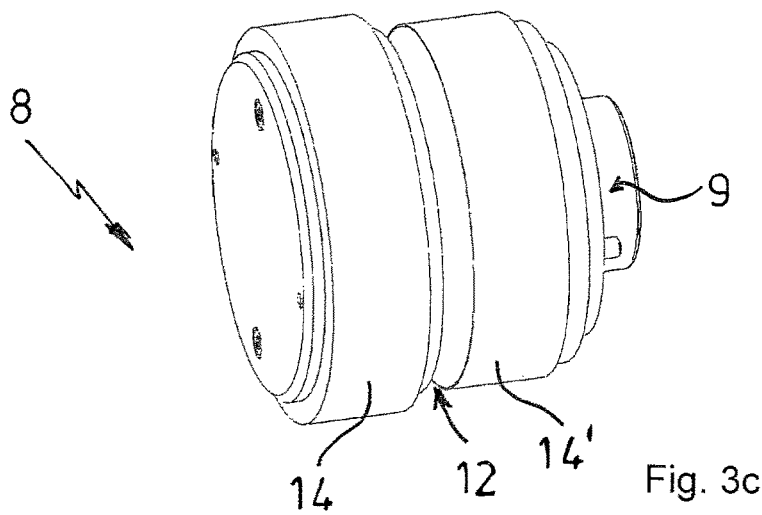
Figure 3D:
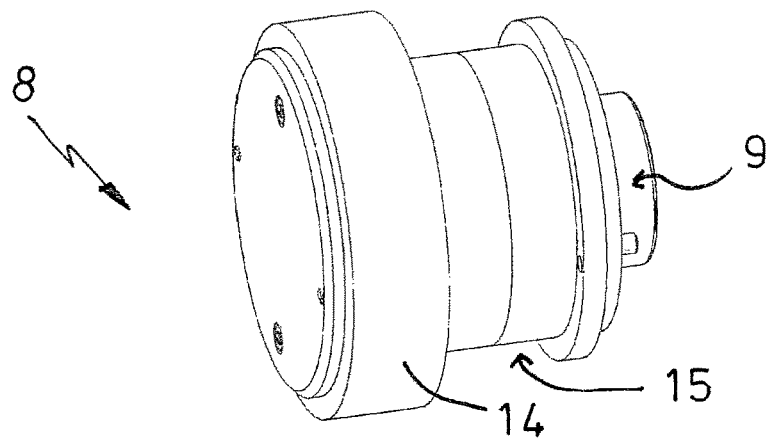

FIGS. 3a to 3d show the modular pressure roller 8 with various interchangeable first shaping elements 14 and optionally usable replaceable second shaping elements 14' arranged thereon. The shaping element 14 is tubular and defines the effective width of the pressure roller 8. This is present in all the embodiments shown in FIGS. 3a to 3d. The second shaping element 14' is annular and, in addition to the shaping element 14, can be selectively arranged concentrically with the shaping element 14. When present, it is preferably laterally connected to the first shaping element 14 without any gap. The second shaping element 14' may also be arranged at an axial distance adjacent to the first shaping element 14. Of course, the pressure roller 8 may have more than two shaping elements 14, 14', optionally arranged on the right or left of the first shaping element 14. The further shaping element 14' optionally added to the first shaping element 14 forms the pressure roller 8 for specific applications, for example for the near-edge welding of upward or downward angled profiles of the supporting surface. The pressure belt and thus the shaping element 14' are not required in the case of bead welding 11. FIGS. 3a and 3c show embodiments of the pressure roller 8, which each comprise the first and the second shaping elements 14, 14', while FIGS. 3b and 3d only show embodiments comprising the first shaping element 14. The first shaping element 14 has an identical width in FIGS. 3a and 3b. This also applies to FIG. 3c, 3d, wherein, in the embodiments shown there, the first shaping element 14 is narrower than in the embodiments in FIGS. 3a and 3b. The second shaping element 14' in FIG. 3c is wider than that in FIG. 3a. In this way, uniform coverage of the drum drive motor 9 is achieved. An annular gap 15 adjacent to the first shaping element 14 is visible in FIGS. 3b and 3d, which is intended to receive the optional second shaping element 14' as shown in FIG. 3a, 3c. The shaping element 14' may, of course, also differ in shape from the shape shown in the figures if it is to take over other functions.

Figure 4A:
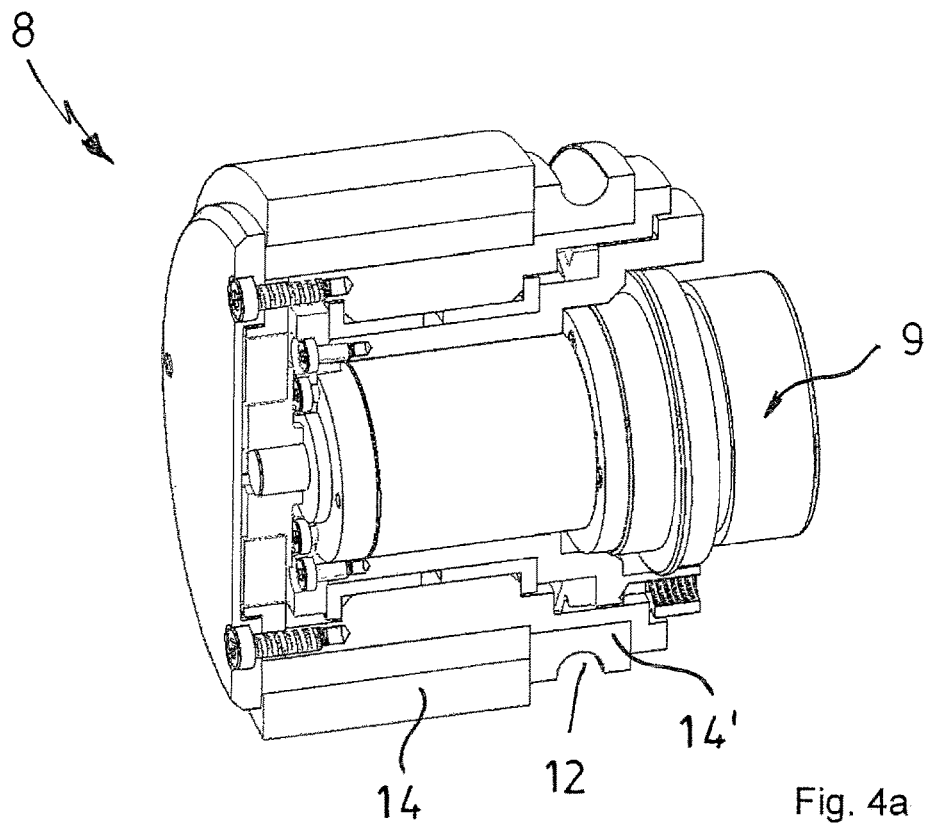
FIG. 4 shows the drum drive motor with the modular pressure roller of the welding machine of FIG. 1 in a longitudinal section, with two shaping elements (FIG. 4a) and with one shaping element (FIG. 4b).
Figure 4B:
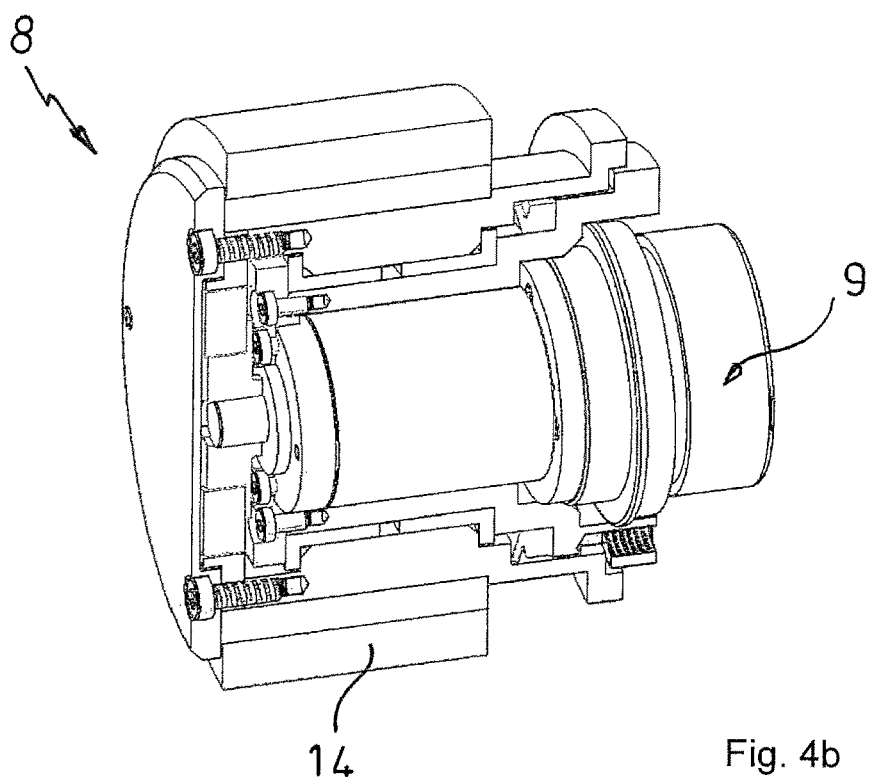

FIGS. 4a and 4b show the pressure roller 8 with the integrated drum drive motor 9 in a longitudinal sectional representation. The drum drive motor 9 is a brushless DC motor with an associated planetary gear. The drum drive motor 9 is only schematically illustrated in the respective FIG. 4. In particular, the drum drive motor 9 is designed as a disk rotor motor integrated into the pressure roller 8. It is attached to an end face of the longitudinal leg 3 (not shown in this figure) of the chassis 2 and is partly over the longitudinal leg 3.

On one of the end faces of the drum drive motor 9 facing away from the longitudinal leg 3, the pressure roller 8 is substantially attached to the drum drive motor 9. It is driven directly by the drum drive motor 9. In FIG. 4a, the drive roller 8 carries a first tubular shaping element 14 and a second tubular shaping element 14' for rotation therewith. The first shaping element 14 determines the width of the pressure roller 8, while the second shaping element 14' is designed to guide and drive the pressure belt 11. The engagement groove 12 for the pressure belt 11 is now clearly visible, wherein, during welding, the pressure belt 11 is pressed against the material web. The engagement groove 12 is formed on the exchangeable shaping element 14', which, like the shaping element 14 which determines the width of the pressure roller 8, is interchangeably mounted on the pressure roller 8 and the drum drive motor 9. This embodiment is suitable alike for near-edge welding, parapet welding or welding on free-standing surfaces. In FIG. 4b, the shaping element 14' for guiding and driving the pressure belt 11 on the pressure roller 8, is missing. The pressure roller 8 only has the shaping element 14, which determines the width of the pressure roller 8. This embodiment is suitable for bead welding.

The invention claimed is:

1. Welding machine (1) for edge-side connection of overlapping upper material webs with overlapped lower material webs, wherein the materials are connectable to one another under the effect of heat and subsequent pressure, with a chassis (2) on which at least guide rollers (5), a heating device (6) and at least one pressure roller (8) are arranged, wherein the heating device (6) has a laterally cantilevered contact heating element (7) that can be inserted between the edges of the material webs, wherein the pressure roller (8), which can be placed on the edges of the material webs, is arranged behind the contact heating element (7) in the working direction and driven by an electric motor with a downstream reduction gear, wherein the chassis (2) is L-shaped or T-shaped with a longitudinal arm (3) extending in the working direction and a lateral leg (4) extending at right angles to the longitudinal leg (3), characterised in that the electric motor is a brushless DC motor and the reduction gear is a planetary gear, which are combined as a drum drive motor (9).

2. Welding machine according to claim 1, characterised in that the direct current motor is a disk rotor motor.

3. Welding machine according to claim 1, characterised in that the drum drive motor (9) is at least partially integrated in the pressure roller (8).

4. Welding machine according to claim 1, characterized in that the drive motor has a power consumption of at least 30 watts, preferably at least 50 watts.

5. Welding machine according to claim 1, characterised in that the planetary gear delivers torque of at least 6 Nm.

6. Welding machine according to claim 1, characterised in that the guide rollers (5) are arranged on the lateral leg (4) protruding downwards, and the pressure roller (8) with the integrated drum drive motor (9) is arranged on the longitudinal leg (3) protruding laterally, wherein the width dimension of the pressure roller (8) and the longitudinal leg (3) taken together, is less than 100 mm.

7. Welding machine according to claim 1, characterised in that the lateral leg (4), with respect to the longitudinal leg (3), is adjustable perpendicularly to the working direction.

8. Welding machine according to claim 1, characterised in that the width, diameter and/or shape of the pressure roller (8) can be varied by means of tubular or cup-shaped shaping elements (14, 14').

9. Welding machine according to claim 1, characterised in that the heating device (6) is electrically operated.

* * * * *